Sept. 16, 1941.    R. W. EDWARDS    2,256,243
FASTENING DEVICE
Filed May 2, 1941
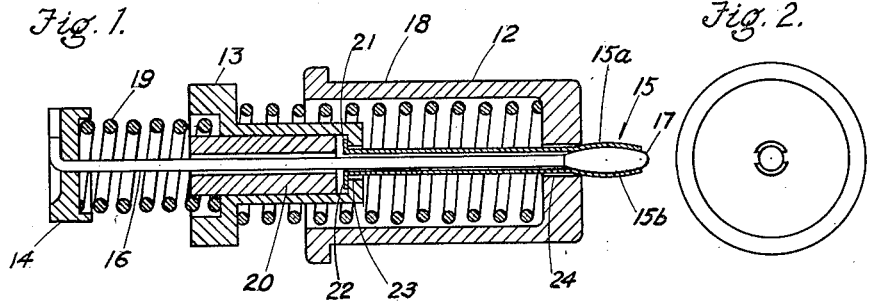
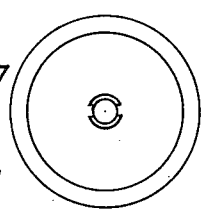
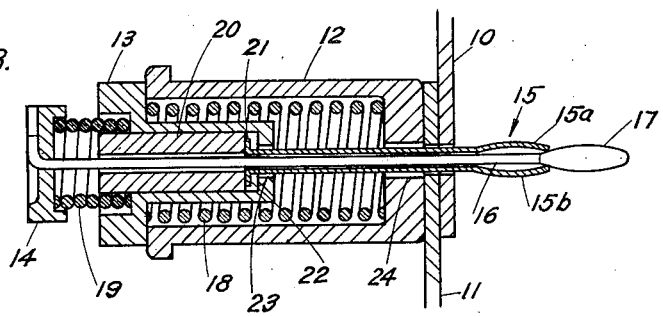
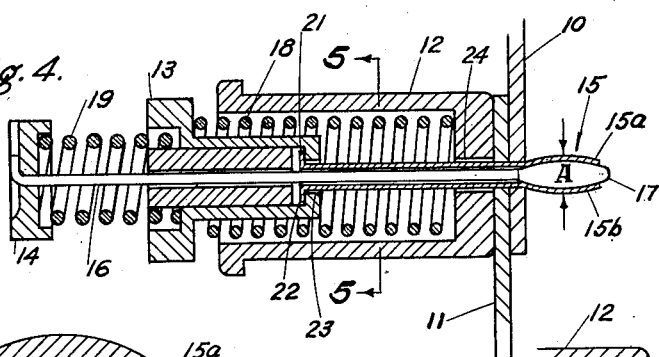
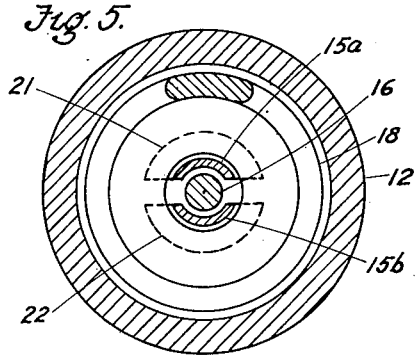
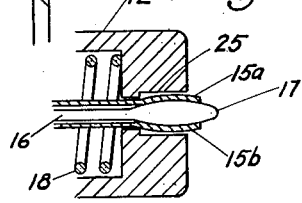
RUSSELL W. EDWARDS
INVENTOR.
BY Crosby Gauthier
ATTORNEY Patented Sept. 16, 1941

2,256,243

UNITED STATES PATENT OFFICE 2,256,243

FASTENING DEVICE

Russell W. Edwards, Los Angeles, Calif.

Application May 2, 1941, Serial No. 391,559

9 Claims. (Cl. 85—5)

This invention relates to fastening devices and has to do more especially with removable rivets and the like.

In the fabrication of riveted sheet metal structures—particularly aircraft—it is the practice, as a preliminary to the riveting operation, to hold together the parts to be joined by means of fasteners in the nature of removable or temporary rivets which can be inserted quickly and removed quickly from the rivet holes and which serve to hold the complementary rivet holes in alignment. The parts thus temporarily articulated are then permanently joined by means of conventional rivets; and when enough of the latter have been put in place and headed up to ensure the alignment of a seam, the temporary rivets are withdrawn and the permanent riveting operation completed.

In manufacturing airplanes the rivet holes are drilled barely larger than the shanks of the rivets to be inserted therein and, for that reason, the rivet holes must be brought accurately into alignment before the rivets can be inserted.

Because of the great number of rivets which enter into the construction of a large metal airplane the cost of that operation is large; and, consequently, riveting speed is of utmost importance. Anything entailing unnecessary delay in getting the rivets into the holes spells reduced efficiency, and it will be apparent that in avoidance of such reduced efficiency it is essential that the removable rivets be capable of aligning and holding in accurate alignment the complementary holes which they occupy. The best of the removable rivets heretofore available are capable under ordinary and favorable circumstances of accurately aligning the rivet holes; but it has been found that where surface irregularities obtain the prior art fasteners in common use will cause enough misalignment of the rivet holes seriously to impede the riveters and thus decrease man-hour production. One of the principal objects of my present invention is to provide a temporary rivet which is self-compensating with respect to small irregularities in the parts to be joined and which, therefore, will bring the rivet holes into alignment notwithstanding such irregularities.

Because of the unavoidable frailness of the pin parts designed to pass through the rivet holes, the removable rivets heretofore used in great quantities by the aircraft industry have been a source of inordinate expense due to excessive breakage; and one of the objects toward which the present invention is directed is a reduction or substantial elimination of that loss.

A further object of my invention is to devise a removable rivet having a body portion of smaller outside diameter than is feasable with similar devices of the prior art—thus greatly facilitating the heading up of closely spaced rivets.

Still another object is to provide a removable rivet which is more efficient in operation and less susceptible of breakage but at the same time less costly to manufacture than any of the related prior art devices.

A preferred embodiment of my invention is illustrated in the accompanying drawing, wherein:

Fig. 1 is a longitudinal sectional view of a removable rivet in its normal state.

Fig. 2 is an end view of the rivet.

Fig. 3 is a sectional view similar to Fig. 1 but showing the springs fully compressed so as to enable the pin and expander to be pushed through a pair of complementary rivet holes.

Fig. 4 is a sectional view similar to Figs. 1 and 2 but showing the device in actual operation as a temporary rivet.

Fig. 5 is a greatly enlarged cross-sectional view taken along the line 5—5 of Fig. 3.

Fig. 6 is a fragmentary sectional view illustrating a modification.

Like other removable rivets of the same class, my rivet is operated most conveniently by a plier of special construction which is well known to those skilled in the art and which, therefore, is not here illustrated.

In Figs. 3 and 4 are shown a pair of overlapping plates 10 and 11, respectively, which have been punched or drilled for riveting, and which it is desired to assemble, preliminarily, with rivet holes in alignment, until a few permanent rivets can be put in place and headed up.

My temporary rivet, in its preferred embodiment, comprises the following major parts: a cup-shaped body member 12; a spring adapter 13; a cap 14; an expansible split pin 15, consisting of two identical parts 15a and 15b; expanding means consisting of a rod or wire 16 to one end of which is attached (or integral with) a bead or enlargement 17; a coil spring 18; a second coil spring 19, and a plug 20.

The two identical parts 15a and 15b which constitute the expansible split pin are elongated spring tempered relatively thin formed sheet steel members of crescent shape cross section (see Fig. 5) and are provided each, at one end, with a flange 21, 22, respectively, by which they are anchored to the adapter 13. Pin 15 extends through an axial opening 23 in adapter 13 and through an axial opening 24 in body member 12. Spring 18 is interposed between body member 12 and adapter 13 and, as shown in Fig. 1, normally serves to hold the adapter away from the body and, consequently, to retract the free ends of the pin members 15a and 15b which, as will be seen, are each bulged semi-ellipsoidally.

The wire or rod 16 is bent at one end and thereby anchored to the cap 14 through which it passes; and, preferably, it is soldered or welded to the cap.

Spring 19 is interposed between adapter 13 and cap 14 and its ultimate function is to pull the bead or enlargement 17, through the medium of wire 16, into the bulged end portion of the pin so as to expand the same. Spring 19 preferably is much stiffer than spring 18 for a reason which presently will be explained.

With the device in its normal state, as depicted in Fig. 1, the bulged portion of the pin is too large, diametrically, to enter a rivet hole of the size in which the device is intended for use; but when the springs are compressed, as per Fig. 3, the bead 17 is ejected from the bulged portion of the pin, allowing the latter to contract diametrically enough to permit its passage through the rivet holes. In addition, the pin parts 15a and 15b, being of spring-tempered steel, will yield diametrically under pressure after bead 17 has been ejected therefrom. The maximum diameter of bead 17 is preferably just slightly less than that of the rivet holes, while the diameter "A" (Fig. 4) of the expanded bulged portion of the pin is larger than that of the rivet holes by an amount equal to twice the thickness of the sheet metal stock out of which the parts 15a and 15b are formed.

While not indispensable to the operativeness of my invention, it is distinctly preferable that spring 19 be substantially stiffer than spring 18; and I shall at this point explain why that is so. Referring to Fig. 3, it will be observed that bead 17 has been pushed out of the bulged portion of the pin and that the bead and bulged portion have been passed through plates 10 and 11. Now, as the operator releases the pressure on cap 14, spring 19, being much stiffer than spring 18, will expand, whereas spring 18 will expand but little or none at all, initially. Hence, bead 17 is pulled back into the bulged portion of the pin before the pin starts to retract under expansion of spring 18. It will be observed that bead 17 is responsive in its movements to expansion and contraction of both springs 18 and 19, but that the longitudinal movements of pin 15 are in response only to expansions and contractions of spring 18.

It will be apparent that by making spring 19 substantially stiffer than spring 18 an advantage is gained in that the projecting end of pin 15 need be only slightly longer than is necessary for it to pass completely through plates 10 and 11 (see Fig. 3). This is true because the pin does not start to retract until after bead 17 has re-entered the bulge of the pin.

If, on the contrary, the two springs 18 and 19 were made of equal stiffness, pin 15 and bead 17 would start retracting simultaneously. The bead would retract more rapidly than the pin because it is responsive to the expansion of both springs while the pin is responsive to only one spring; and if the pin and wire 16 and other parts were made long enough the bead would enter the bulge of the pin before the latter was retracted back through the rivet holes.

A temporary rivet such as herein described, but having springs of equal stiffness or in which spring 18 is even somewhat stiffer than spring 19 would be operative and, I believe, entirely feasable and for that reason I do not wish to be understood as disclaiming any embodiment of my invention in which spring 19 is not stiffer than spring 18.

Plug 20 may be either threaded into or pressed into the adapter 13. Preferably it is inserted to such an extent as to allow of some space between the end of the plug and the flanges 21 and 22. This permits of a limited angular and unequal longitudinal axial displacement of the pin parts 15a and 15b and of the pin as a whole relative to the adapter—all of which is desirable as a compensating factor with respect to irregularities in the parts to be riveted. It serves to avoid or lessen the setting up of stresses which it is believed have been responsible for much of the breakage which has heretofore been experienced in the use of temporary rivets in the aircraft industry.

Another feature which contributes to avoidance of lateral strains resulting from irregularities in the parts to be riveted is the fact that adapter 13 floats on springs 18 and is therefore capable of moving angularly about its axis so as to compensate for high spots on the parts to be riveted such as would cause the longitudinal axis of body 12 to be deflected out of alignment with the rivet holes.

But even more important than the reduction of breakage which my temporary rivet has accomplished, is the fact that, due to the full floating construction illustrated and the symmetrical arrangement of pin parts and expander, the pin is effective to pull the rivet holes into accurate alignment notwithstanding small irregularities which cause tilting of the body 12, axially, with respect to the axis of the rivet holes. With a pin connected rigidly to the body any such tilting is certain to cause some misalignment of the rivet holes; and a misalignment of one pair of rivet holes in a seam will generally cause misalignment of all of them—making it difficult to insert the permanent rivets. While that might not be very important on a casual riveting job, it is very important in the aircraft industry where riveting operations are conducted on a huge scale and where riveting speed is of paramount importance.

Another desirable feature of my temporary rivet is that the body 12 may be of very small diameter so as to permit it to be used where rivet holes are very close together and where it is necessary to provide a temporary fastener in a rivet hole immediately adjacent to one in which a permanent rivet is to headed up. Often, in the past, it has been necessary to grind flat spots on the bodies of temporary rivets in order to provide clearance for the riveting tool. My temporary rivet can be made of extremely small body diameter for use in close quarters—although for general use I prefer to make it of a diameter somewhat larger than the minimum.

Parts 12, 13, and 14, as illustrated are suitable for screw machine or die cast production; but it will be self-evident that these parts, slightly modified, can be made of sheet metal in a punch press.

Part 16 is preferably a piece of music wire, but I refer to it, broadly, as a rod, because it is not necessarily wire.

The bead 17 is preferably made by swaging the wire 16 and is integral therewith. It may, however, be a separate part attached to the wire or rod. Preferably, it is approximately ellipsoidal in form.

Springs 18 and 19 could be replaced by rubber cushions, but probably to no advantage. However, I wish it to be understood that in referring to springs I mean to include rubber and other resilient cushioning means within the scope of that term.

For want of a better and more descriptive term I have referred to the parts 15a and 15b, jointly, as a "pin." That term was chosen because the parts in question perform a function which is commonly performed by a pin.

The cap 14 is merely a convenient means of interconnecting the end of rod or wire 16 with spring 19 and in using the term "cap" in the appended claims I intend to include any means whatever for effecting such a connection. Likewise, the adapter 13 is merely a convenient means of establishing a suitable connection between pin 15 and the springs and of providing a stop for limiting the travel of the pin and compression of spring 18; and I mean to embrace within the scope of that term any means adapted to accomplish either or both of those functions.

In Fig. 6 there is illustrated a modification of the previously described device, wherein the body 12 is recessed at 25 to form a pocket for the reception of the bulged end of the pin when the latter is retracted. This construction is advantageous in that it provides protection for the pin and bead against injury due to rough handling. If desired, recess 25 can be made deep enough to permit the bulged end of the pin and bead 17 to be drawn completely into the body.

What is claimed is:

1. A fastener comprising: a body, an expansible elongated pin co-axial with said body and projectable axially therefrom, a spring connected to one end of said pin and functionally interposed between said pin and said body and operative to retract said pin longitudinally, a second spring in series with said first spring, a rod connected to said second spring at a point remote from said first spring, said rod extending axially through said pin and having an enlargement at its free end portion, said enlargment being operative to engage the free end portion of said pin and effect expansion thereof, said enlargement normally engaging said pin to effect diametrical expansion thereof but movable axially to permit diametrical contraction of said pin in response to compression of said second-mentioned spring.

2. A fastener comprising: a body, an expansible, elongated split pin co-axial with said body and having a free end portion projectable axially therefrom, said free end portion being bulged, a spring within said body and interposed functionally between said body and said pin, that end of said pin which is remote from said free end being connected to said spring, a second spring in series with said first spring and situated adjacent that end of said first spring to which said pin is connected, a rod connected to said second spring at a point remote from said first spring, said rod extending axially through said pin, and expanding means carried by said rod and operative upon the bulged portion of said pin to effect diametrical expansion thereof, said expanding means being movable out of operative engagement with said pin in response to compression of said second-mentioned spring.

3. A fastener comprising: a body, an expansible, elongated split pin co-axial with said body and having a free end portion projectable axially therefrom, said free end portion being bulged diametrically, a bead operative to occupy the interior of the bulged portion of said pin so as to effect diametrical expansion thereof, said bead being ejectable from said bulged portion to permit contraction thereof, and yieldable means normally holding said bead within the bulged portion of said pin.

4. A fastener comprising: a body, an expansible, elongated split pin co-axial with said body and having a free end portion projectable axially therefrom, said free end portion being bulged diametrically, a bead operative to occupy the interior of the bulged portion of said pin so as to effect diametrical expansion thereof, a spring within said body and connected to that end of said pin which is remote from said bulged portion, said pin being movable axially in response to compression and expansion of said spring, a second spring in series with said first spring and disposed adjacent to that end of said first spring which is remote from the bulged portion of said pin, and a rod connected to said bead and extending axially through said pin and said springs, said rod being connected to said second spring at a point remote from said first spring, said rod being operative in response to compression of said second spring to move said bead out of the bulged portion of said pin, said second spring being operative, when released, to retract said bead into said bulged portion.

5. A fastener comprising: a body and a cap and an adapter interposed between said body and cap, an expansible pin anchored at one end to said adapter and extending through said body, expanding means for said pin including a bead and a rod attached at one end to said bead, said rod extending longitudinally through said pin, body and adapter and connected to said cap at the end of said rod remote from said bead, a relatively soft spring interposed between said adapter and said body and a relatively stiff spring interposed between said adapter and cap, said bead normally being held by said relatively stiff spring in engagement with said pin so as to expand the end portion thereof, said bead being movable away from said pin in response to compression of said relatively stiff spring whereby to permit said pin to contract diametrically.

6. A fastener comprising: a body, an adapter and a cap in axial alignment, said adapter being interposed between said body and cap, a diametrically expansible split pin anchored at one end to said adapter and extending through said body, expanding means for said pin including a rod attached at one end to said cap and extending axially through said adapter, body and pin, said rod having an enlargement at the end thereof remote from said cap, said enlargement being normally in actuating engagement with the free end portion of said pin for expanding the same, a relatively soft spring interposed between said body and said adapter and a relatively stiff spring interposed between said plunger and said cap.

7. A fastener comprising: a body, an adapter and a cap in axial alignment, said adapter being interposed between said body and cap, a diametrically expansible split pin loosely anchored at one end to said adapter, said pin being capable of limited angular axial displacement with respect to the axis of said adapter and body, expanding means for said pin including a rod attached at one end to said cap and extending axially through said adapter, body and pin, said rod having an enlargement at the end thereof remote from said cap, said enlargement being normally in actuating engagement with the free end portion of said pin for expanding the same, a relatively soft spring interposed between said body and said adapter, and a relatively stiff spring interposed between said adapter and said cap.

8. A removable rivet comprising: a body, a diametrically expansible pin consisting of a plurality of elongated members disposed substantially symmetrically about a common longitudinal axis, said pin being movable longitudinally relatively to said body, one end portion of said pin being bulged, a bead situated adjacent the bulged end portion of said pin and capable of entering said bulged portion for expanding the same, a spring for retracting said pin into said body, said spring being responsive to a compressive force to permit the bulged end portion of said pin to be projected away from said body, a second spring, stiffer than said first-mentioned spring and in series therewith, said second spring being situated at that end of said first-mentioned spring which is most remote from said bulged portion, a rod extending axially through said pin and springs, said rod being connected at one end to said bead and at the other end to said second spring, said springs being normally operative to hold said pin and bead in their retracted positions.

9. A removable rivet comprising: a cup-shaped body member having an axial opening, a coil spring seated within said member and co-axial therewith, a second coil spring substantially stiffer than said first-mentioned spring and situated in series therewith, said springs having a common axis, an adapter interposed between said springs and co-operative with said body member to limit the deflection of said first-mentioned spring under compression, a diametrically expansible pin consisting of a plurality of elongated parts disposed substantially symmetrically about the axis of said body member and extending longitudinally through said axial opening, said pin being loosely anchored at one end to said adapter and having a bulged portion at its other end, an expander bead normally situated within said bulged portion but movable therefrom along said axis, and a rod connected to said bead and extending axially through said pin, body and springs, said rod being connected to said second-mentioned springs at a point remote from said first-mentioned spring.

RUSSELL W. EDWARDS.